US008282065B1

(12) United States Patent
Stone

(10) Patent No.: US 8,282,065 B1
(45) Date of Patent: Oct. 9, 2012

(54) COMPACT, COLLAPSIBLE, SELF-ERECTING STAND AND METHOD OF MAKING

(76) Inventor: Myron Stone, Weehawken, NJ (US)

( * ) Notice: Subject to any disclaimer, the term of this patent is extended or adjusted under 35 U.S.C. 154(b) by 0 days.

(21) Appl. No.: 13/178,113

(22) Filed: Jul. 7, 2011

(51) Int. Cl.
*A47G 1/24* (2006.01)

(52) U.S. Cl. ... 248/454; 248/459; 248/460; 248/346.01; 248/346.3; 206/45.2; 206/45.24; 16/221; 211/132.1

(58) Field of Classification Search ............... 248/454, 248/459, 460, 461, 462, 176.3, 441.1, 444, 248/447, 448, 346.04, 346.01; 206/45.2, 206/45.24, 320; 16/221, 225; 211/132.1
See application file for complete search history.

(56) References Cited

U.S. PATENT DOCUMENTS

| 1,614,977 | A |   | 1/1927  | Ausmus |         |
|-----------|---|---|---------|--------|---------|
| 3,041,637 | A |   | 7/1962  | Emery  |         |
| 3,097,444 | A | * | 7/1963  | Steiner | ......... 248/454 |
| 3,119,194 | A |   | 1/1964  | Ray    |         |
| 3,121,884 | A |   | 2/1964  | Emery  |         |
| 3,195,850 | A | * | 7/1965  | Steiner | ......... 248/454 |
| 3,410,516 | A |   | 11/1968 | Criswell |       |
| 4,044,980 | A |   | 8/1977  | Cummins |        |
| 4,105,182 | A |   | 8/1978  | Jacobson |       |
| 4,586,680 | A | * | 5/1986  | DiTommaso et al. ........ 244/3.27 |
| 4,709,895 | A |   | 12/1987 | Mardak |         |
| 4,991,812 | A |   | 2/1991  | MacEwan |        |
| 5,080,316 | A |   | 1/1992  | MacEwan |        |
| 6,270,049 | B1 | * | 8/2001  | Olvey ......... 248/441.1 |
| 7,367,539 | B2 | * | 5/2008  | Moss et al. ......... 248/460 |
| 7,735,644 | B2 | * | 6/2010  | Sirichai et al. ......... 206/320 |
| 2005/0092705 | A1 | * | 5/2005 | Moss et al. ......... 211/132.1 |

* cited by examiner

*Primary Examiner* — Amy Sterling
*Assistant Examiner* — Todd M Epps
(74) *Attorney, Agent, or Firm* — Arthur Jacob

(57) ABSTRACT

A compact, collapsible, self-erecting stand and a method of making the stand are disclosed. The stand is constructed for placement upon a supporting substrate to prop a hand-held electronic device to be placed on the supporting substrate and includes an elongate strip of material having resiliently flexible characteristics biasing the strip toward a substantially flat configuration. A plurality of substantially rigid plates are affixed to the strip and located along the strip to establish a corresponding plurality of panels. A hinge section of the strip is interposed between adjacent panels, each hinge section being unitary with the strip and biasing corresponding adjacent panels toward the substantially flat configuration of the strip such that the panels are movable selectively into a collapsed configuration, wherein the panels are folded about the hinge sections into overlapping juxtaposition for compact carrying, and are released selectively to be moved into an erect configuration in response to biasing forces at the hinge sections to elevate certain ones of the panels relative to a basal one of the panels for providing a prop for an electronic device to be placed on the supporting substrate.

18 Claims, 5 Drawing Sheets

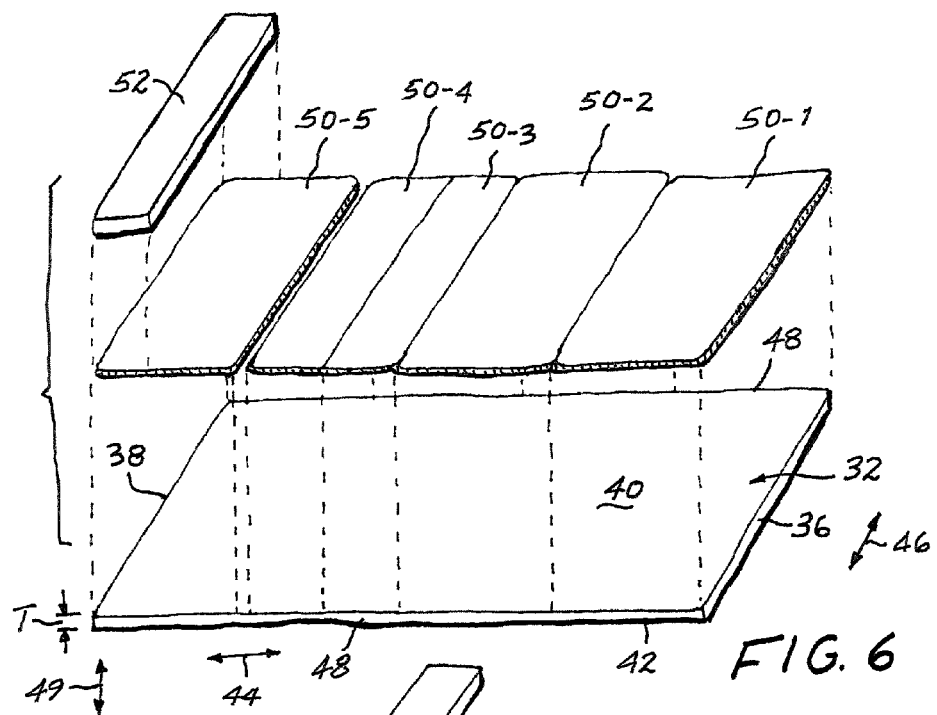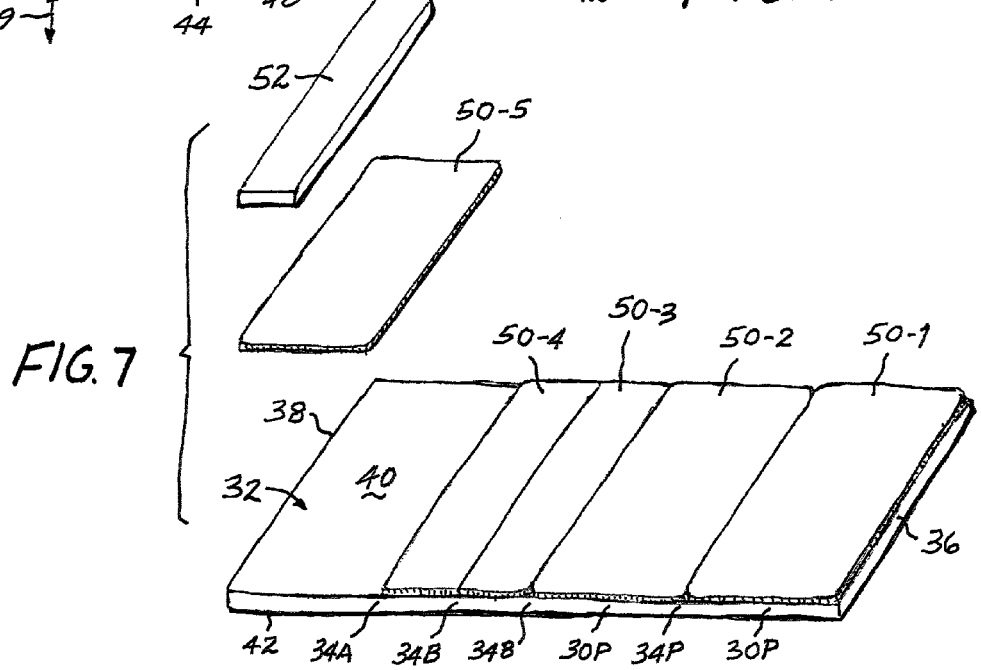

COMPACT, COLLAPSIBLE, SELF-ERECTING STAND AND METHOD OF MAKING

The present invention relates generally to the convenient propping of a portable electronic device, such as an electronic tablet, upon a work surface and pertains, more specifically, to a relatively small stand which is collapsed readily into a compact configuration for ease of carrying and which is self-erecting upon being deployed for use.

The rapidly growing use of portable electronic devices, such as electronic tablets, electronic readers, wireless smart-phones and the like, has given rise to the need for a conveniently carried, easily deployed support upon which such a portable device can be rested during use. While a wide variety of stands have been made available for use in connection with a myriad of portable items, currently available stands often are cumbersome, heavy, demand an inordinate volume of space for storage or carrying, and require relatively elaborate set-up procedures upon deployment. Moreover, many of these stands are relatively complex in construction, requiring increased manufacturing costs.

The present invention provides a stand that avoids the above-outlined drawbacks and provides a simply-constructed, easily-carried and readily-deployed stand especially well-suited for use in connection with portable electronic devices. As such, the present invention attains several objects and advantages, some of which are summarized as follows: Provides a stand that can be folded readily into a compact configuration having dimensions allowing ready carrying, even within a limited volume, such as in a shirt pocket, while being self-erecting for exceptional ease of deployment for use; establishes an effective and reliable prop for a portable electronic device or the like, in a highly compact and light-weight stand; is exceptionally simple in design and construction for economy of manufacture and enhanced versatility; allows simplified collapsing for carrying, and subsequent quick set-up for use; enables increased versatility for widespread use in connection with a variety of portable items, such as electronic tablets, electronic readers, smart-phones and the like; allows ease of manufacture and increased economy through the method and materials employed in the construction of a reliable stand; provides a stand that exhibits exemplary performance over an extended service life.

The above objects and advantages, as well as further objects and advantages, are attained by the present invention which may be described briefly as a compact, collapsible, self-erecting stand for placement upon a supporting substrate to prop a hand-held electronic device to be placed on the supporting substrate, the stand comprising: an elongate strip of material having resiliently flexible characteristics biasing the strip toward a substantially flat configuration extending in a longitudinal direction between first and second terminal ends, in a lateral direction between first and second sides, and in an altitudinal direction between an obverse surface and a reverse surface; a plurality of substantially rigid plates affixed to the strip and located along the strip to establish a corresponding plurality of panels, each panel comprising a plate affixed to a corresponding surface portion of the strip; and a hinge section of the strip interposed between adjacent panels, each hinge section being unitary with the strip and biasing corresponding adjacent panels toward the substantially flat configuration of the strip such that the panels are movable selectively into a collapsed configuration, wherein the panels are folded about the hinge sections into overlapping juxtaposition for compact carrying, and are released selectively to be moved into an erect configuration in response to biasing forces at the hinge sections to raise certain ones of the panels in the altitudinal direction, relative to a basal one of the panels for providing a prop for an electronic device to be placed on the supporting substrate.

In addition, the present invention provides a method for constructing a compact, collapsible, self-erecting stand for placement upon a supporting substrate to prop a hand-held electronic device to be placed on the supporting substrate, the method comprising: providing an elongate strip of material having resiliently flexible characteristics biasing the strip toward a substantially flat configuration extending in a longitudinal direction between first and second terminal ends, in a lateral direction between first and second sides, and in an altitudinal direction between an obverse surface and a reverse surface; affixing a plurality of substantially rigid plates to the strip, located along the strip to establish a corresponding plurality of panels, each panel comprising a plate affixed to a corresponding surface portion of the strip; and providing a hinge section of the strip interposed between adjacent panels, each hinge section biasing corresponding adjacent panels toward the substantially flat configuration of the strip such that the panels are movable selectively into a collapsed configuration, wherein the panels are folded about the hinge sections into overlapping juxtaposition for compact carrying, and are released selectively to be moved into an erect configuration in response to biasing forces at the hinged sections to raise certain ones of the panels in the altitudinal direction, relative to a basal one of the panels for establishing a prop for an electronic device to be placed on the supporting substrate.

The invention will be understood more fully, while still further objects and advantages will become apparent, in the following detailed description of preferred embodiments of the invention illustrated in the accompanying drawing, in which:

FIG. 6 is a largely diagrammatic, exploded pictorial view showing a stage in the method of making the stand;

FIG. 7 is a largely diagrammatic, exploded pictorial view showing another stage in the method of making the stand;

Figure 1:
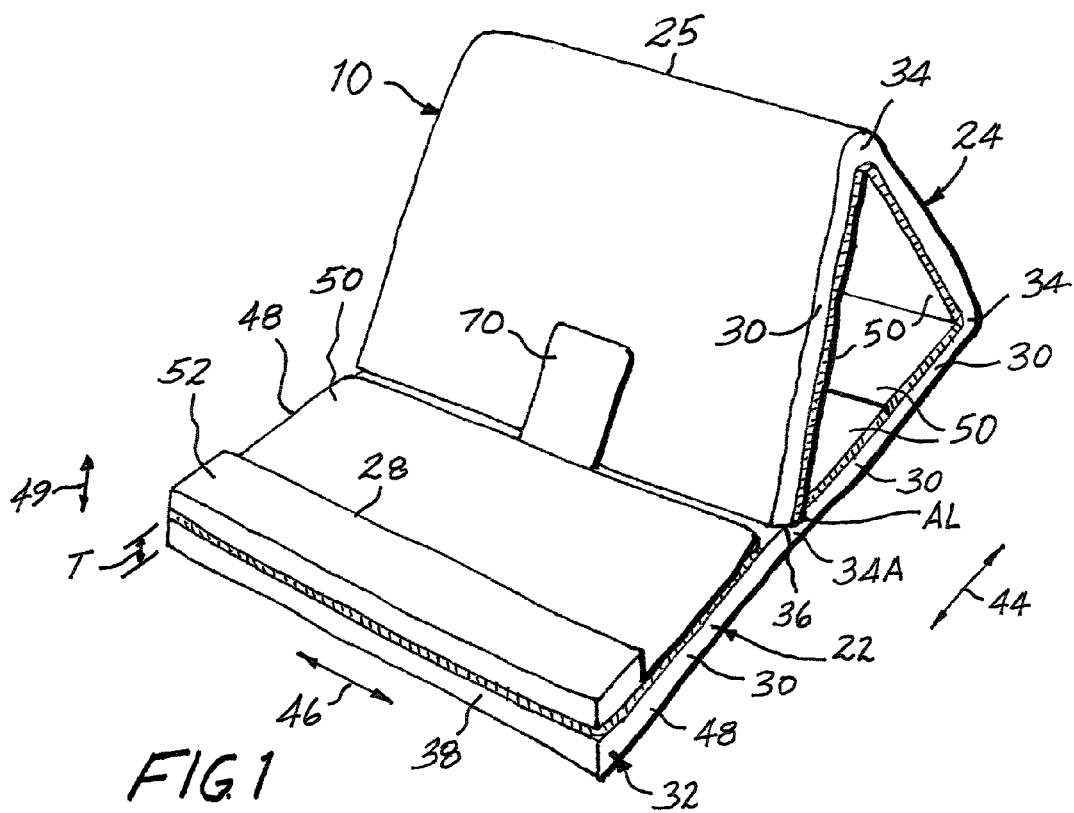
FIG. 1 is a pictorial view of a stand constructed in accordance with the present invention and shown in an erect configuration.
Figure 2:
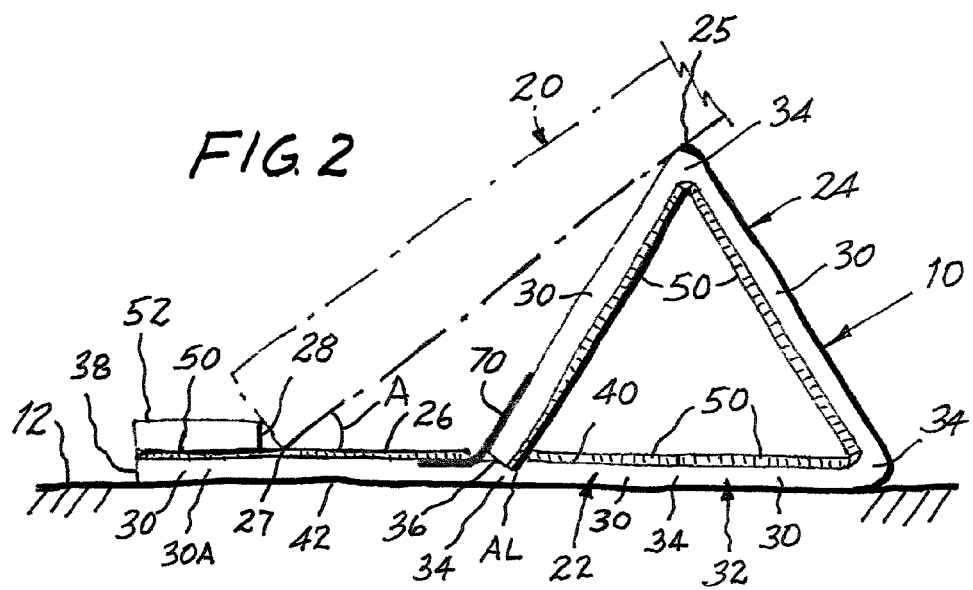
FIG. 2 is a side elevational view of the stand erected as shown in FIG. 1.

Referring now to the drawing, and especially to FIGS. 1 and 2 thereof, a stand constructed in accordance with the present invention is shown at 10 and is seen to be in an erect configuration, placed upon a supporting substrate in the form of a work surface 12 to serve as a prop for a portable electronic device, illustrated in phantom in FIG. 2 in the form of an electronic tablet 20. Stand 10 includes a base 22 for resting upon work surface 12 and an elevated construct 24 having a generally triangular cross-sectional configuration extending upwardly from base 22 to an apex 25. When tablet 20 is to be positioned for use upon work surface 12, the tablet 20 is placed upon a platform 26 provided by base 22 and is propped against elevated construct 24, in contact with elevated construct 24 at apex 25, with the lower edge 27 of tablet 20 engaging a stop shoulder 28 on the base 22, spaced longitudinally from the elevated construct 24, so that the elevated construct 24 serves as a prop against which the tablet 20 is supported at an angle A prescribed as an optimal angle for enabling convenient and effective use of tablet 20 on work surface 12. It is noted that tablet 20 is generally rectangular and may be supported upon stand 10 in either a landscape orientation, wherein a long side of the rectangular configuration rests upon platform 26, or a portrait orientation, wherein a short side of the rectangular configuration rests upon platform 26.

Stand 10 includes a plurality of panels 30 arranged preferably serially along a unitary elongate strip 32 of material such that adjacent panels 30 are joined together at hinge sections 34 interposed between the adjacent panels 30. The material of strip 32 has resiliently flexible characteristics that are elastic in nature so that the hinge sections 34 bias the strip 32 toward a substantially flat configuration extending between a first terminal end 36 and a second terminal end 38, the preferred material being an elastomeric material such as rubber or a rubberized material, which materials are commercially available. Strip 32 has an obverse surface 40 and a reverse surface 42, both surfaces 40 and 42 extending in longitudinal directions 44 between the first and second terminal ends 36 and 38, extending in lateral directions 46 between laterally opposite sides 48, and spaced apart in altitudinal directions 49 by a thickness T. Each panel 30 includes a substantially rigid plate 50 affixed to the strip 32, as with an adhesive connection, and the first end 36 of the strip 32 is affixed to the obverse surface 40 of strip 30 at an altitudinal location AL placed at hinge section 34A so that each panel 30 itself is rendered substantially rigid, as compared to the resiliently flexible strip 32, and the rigid panels 30 are biased into the erect configuration illustrated in FIGS. 1 and 2, by resilient biasing forces established at hinge sections 34, as will be described in further detail below. Stop shoulder 28 is established by a bar 52 affixed to panel 30A, adjacent second end 38 of the strip 32.

Figure 3:
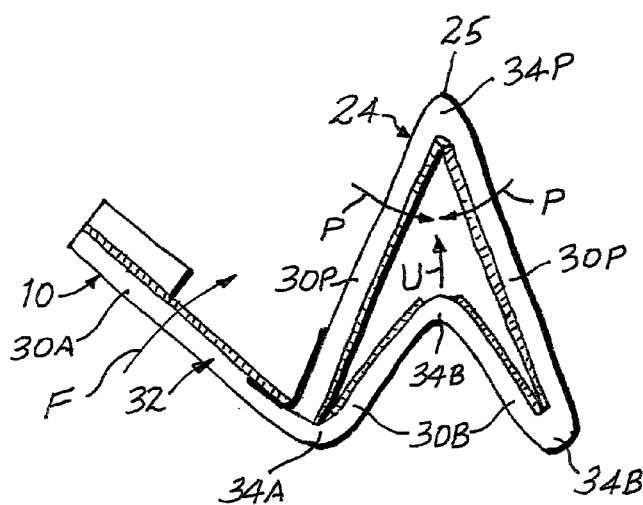
FIG. 3 is a side elevational view similar to FIG. 2 and showing the stand in an intermediate configuration, between an erect configuration, as shown in FIG. 2, and a collapsed configuration, as shown in FIG. 4.
Figure 4:
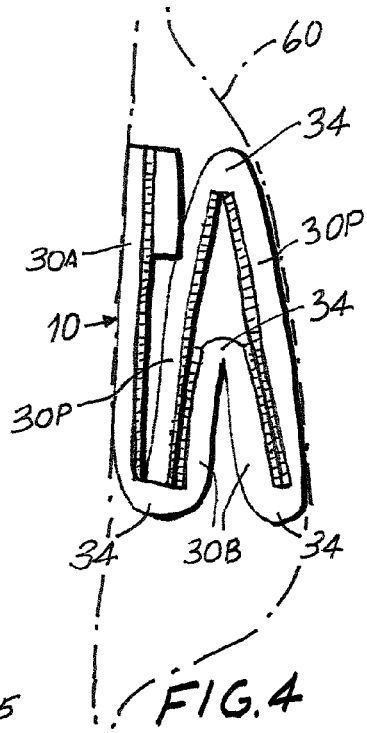
FIG. 4 is a side elevational view showing the stand in a collapsed configuration, ready for carrying or for storage.

Turning now to FIGS. 3 and 4, when it is desired to fold stand 10 into a compact, collapsed configuration for convenient carrying, or for compact storage, panels 30 are folded about hinge sections 34, against resilient biasing forces generated by bending of the strip 32 and thereby stretching the material of strip 32 at the hinge sections 34, as shown. Thus, basal panels 30B are pushed altitudinally upwardly, in the direction of arrow U, against the bias of hinge sections 34B and 34P as well as hinge section 34A, to be positioned between apical panels 30P which are moved toward one another, in the direction of arrows P, against the bias of apical hinge section 34P located at the apex 25 of the triangular configured elevated construct 24. At the same time, panel 30A is folded about hinge section 34A, in the direction of arrow F, against the biasing force generated at hinge section 34A, to be placed in overlapping juxtaposition with the folded apical panels 30P, all as illustrated in FIG. 4 wherein the stand 10 is shown in a fully collapsed configuration, compact enough to fit within a shirt pocket, illustrated in phantom at 60, where the stand 10 is confined to the folded, collapsed configuration, against the biasing forces at the now-stretched hinge sections 34. To that end, the thickness T of the strip 32 is approximately three-thirty-seconds of an inch, while the plates 50 have a thickness of about one-thirty-second of an inch. In addition, plates 50 placed along the apical panels 30P have a length along the longitudinal directions 44 of approximately two inches and a width along the lateral directions 46 of approximately three and eleven-thirty-seconds of an inch, so that the plates 50 of apical panels 30P are about the size of a common credit or debit card, rendering the folded stand 10 as convenient to carry as are such cards. Plates 50 are constructed economically of plastic card stock, similar to that of credit cards and the like.

When it is desired to deploy stand 10 for use, the folded stand 10 merely is withdrawn from the confinement of pocket 60 and is placed upon work surface 12. Once freed to move in response to the biasing forces at the hinge sections 34, the panels 30 will be driven by the bias of the hinge sections 34 from the collapsed configuration shown in FIG. 4 into the erect configuration illustrated in FIGS. 1 and 2, wherein basal panels 30B extend along a basal leg of the triangular cross-sectional configuration of the elevated construct 24, while apical panels 30P extend along apical legs of the triangular cross-sectional configuration. Thus, the construction of stand 10 renders the stand self-erecting. Once erected, the stand 10 rests upon the reverse surface 42 of the strip 32, which reverse surface 42 has high frictional characteristics provided by the resiliently flexible elastomeric nature of the material of the strip 32. With the tablet 20 placed upon the stand 10, the stand 10 will remain firmly seated upon the work surface 12 during use, the high frictional characteristics militating against unwanted sliding of the stand 10 along the work surface 12. At the same time, the high frictional characteristics of the material of the strip 32 along obverse surface 40 militate against unwanted movements of the tablet 20 relative to the stand 10, by virtue of the engagement of tablet 20 with the obverse surface 40 at apex 25 of the elevated construct 24.

Figure 5:
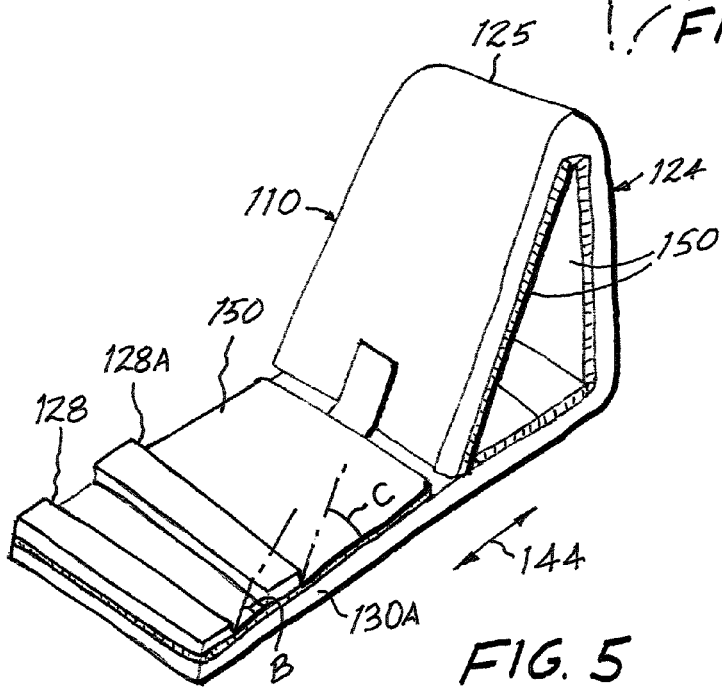
FIG. 5 is a pictorial view similar to FIG. 1 and showing another stand constructed in accordance with the present invention.

In the embodiment illustrated in FIG. 5, a stand 110 is constructed in a similar manner to stand 10; however, in the present embodiment, the orientation of the plates 150 is altered as compared to the orientation of plates 50 in stand 10, so that the longer dimension of each plate 150 is aligned with the longitudinal directions 144. In that way, the elevated construct 124 provides a higher apex 125 than in the earlier-described embodiment of stand 10, and the length of panel 130A, which extends to the end 138 of the stand 110, is great enough to accommodate two stop shoulders 128 and 128A, spaced apart along the longitudinal directions 144 to enable a tablet 20 to be supported at either one of two different available angles B and C, angle B being somewhat shallower than angle C. Once folded, as described in connection with stand 10, stand 110 also will exhibit dimensions which enable the folded, collapsed configuration to resemble the dimensions of a credit card or the like for fitting within a pocket that can accommodate such dimensions.

Figure 8:
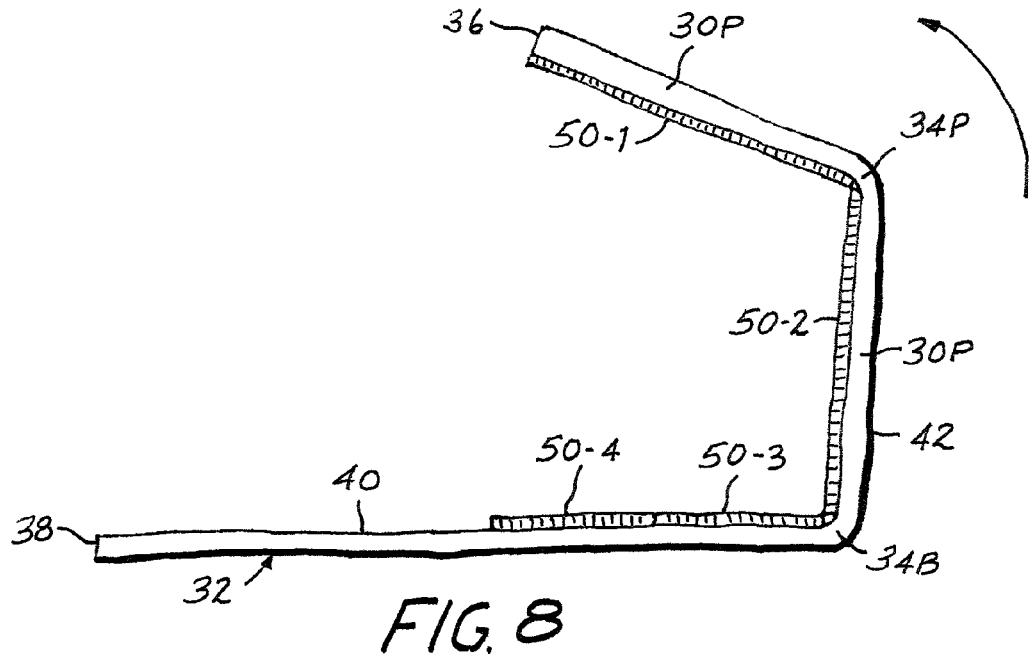
FIG. 8 is a side elevational view showing a further stage in the method of making the stand.
Figure 9:
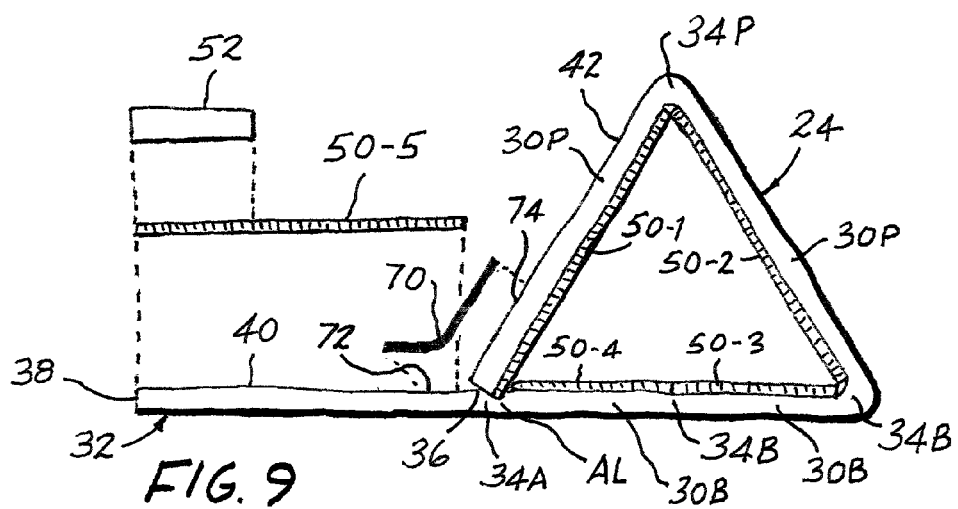
FIG. 9 is a side elevational view showing a still further stage in the method of making the stand.

Referring now to FIGS. 6 through 9, the method of constructing stand 10 enables simple and economical manufacture. As seen in FIG. 6, strip 32, in a prescribed length of resiliently flexible material, is laid out in a flat configuration and extends longitudinally between the first and second terminal ends 36 and 38. Plates 50-1, 50-2, 50-3 and 50-4 then are positioned along the obverse surface 40 of strip 32 and affixed to the strip 32, as by an adhesive, establishing panels 30P and 30B with hinge sections 34B and 34P interposed between respective adjacent panels, as illustrated in FIG. 7. With the plates 50-1, 50-2, 50-3 and 50-4 affixed to the obverse surface 40 of strip 32, the two panels 30P adjacent end 36 of strip 32 are rotated about respective hinge sections 34B and 34P, as seen in FIG. 8, until end 36 is juxtaposed with hinge section 34A, creating elevated construct 24, having a triangular cross-sectional configuration as shown in FIG. 9. At the same time, the material of strip 32 is stretched at the hinge sections 34B and 34P, and the stretched material establishes biasing forces tending to maintain the triangular cross-sectional configuration of the elevated construct 24. Then, end 36 is affixed to the obverse surface 40, at the attachment location AL placed at hinge section 34A, as by a tab 70 adhered to the obverse surface 40 at 72 and to the reverse surface 42 of the strip 32, at 74, thereby securing the triangular cross-sectional configuration of the elevated construct 24. Finally, plate 50-5 is affixed to the obverse surface 40 of strip 32, adjacent end 38 of the strip 32 and overlapping tab 70, to establish platform 26. Bar 52 is affixed to plate 50-5 at end 38 of the strip 32 to establish stop shoulder 28 and complete the stand 10. In this manner, construction is completed with simplicity, ease and economy.

Figure 10:
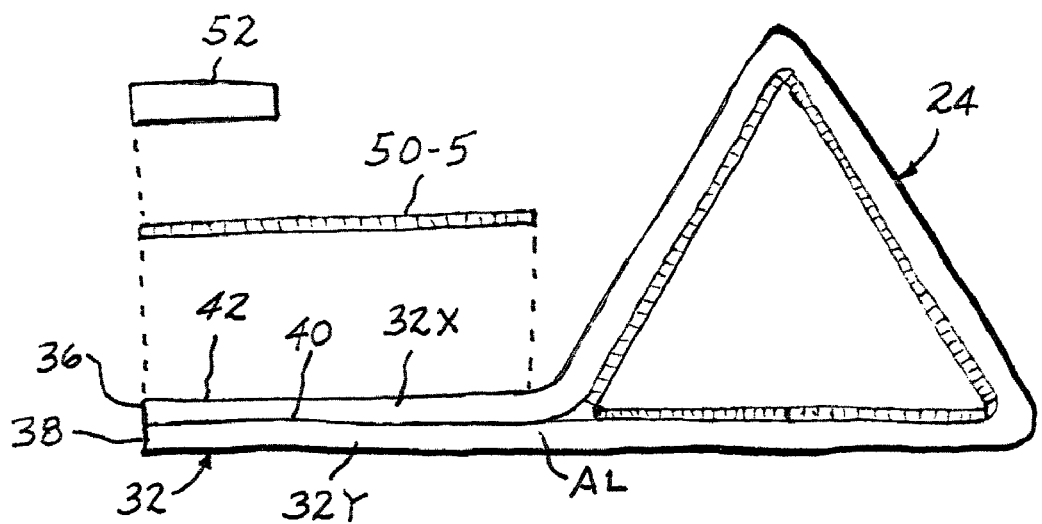
FIG. 10 is a side elevational view similar to FIG. 9 and showing an alternate construction.

In an alternate construction illustrated in FIG. 10, like parts are identified with the same reference characters as in FIG. 9; however, in the embodiment of FIG. 10 tab 70 has been eliminated in favor of an extension 32X of strip 32, adjacent terminal end 36, which extension 32X is adhered to obverse surface 40 of strip 32 along portion 32Y of strip 32, portion 32Y extending adjacent terminal end 38, between attachment location AL and terminal end 38. Plate 50-5 is affixed to reverse surface 42 of strip 32 along extension 32X, and bar 52 is affixed to plate 50-5 to complete the alternate construction.

It will be seen that the present invention attains all of the objects and advantages set forth above, namely: Provides a stand that can be folded readily into a compact configuration having dimensions allowing ready carrying, even within a limited volume, such as in a shirt pocket, while being self-erecting for exceptional ease of deployment for use; establishes an effective and reliable prop for a portable electronic device or the like, in a highly compact and lightweight stand; is exceptionally simple in design and construction for economy of manufacture and enhanced versatility; allows simplified collapsing for carrying, and subsequent quick set-up for use; enables increased versatility for widespread use in connection with a variety of portable items, such as electronic tablets, smart-phones and the like; allows ease of manufacture and increased economy through the method and materials employed in the construction of a reliable stand; provides a stand that exhibits exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The invention claimed is:

1. A compact, collapsible, self-erecting stand for placement upon a supporting substrate to prop a hand-held electronic device to be placed on the supporting substrate, the stand comprising:
   an elongate strip of material having resiliently flexible characteristics biasing the strip toward a substantially flat configuration extending in a longitudinal direction between first and second terminal ends, in a lateral direction between first and second sides, and in an altitudinal direction between an obverse surface and a reverse surface;
   a plurality of substantially rigid plates affixed to the strip and located along the strip to establish a corresponding plurality of panels, each panel comprising a plate affixed to a corresponding surface portion of the strip; and
   a hinge section of the strip interposed between adjacent panels, each hinge section being unitary with the strip and biasing corresponding adjacent panels toward the substantially flat configuration of the strip such that the panels are movable selectively into a collapsed configuration, wherein the panels are folded about the hinge sections into overlapping juxtaposition for compact carrying, and are released selectively to be moved into an erect configuration in response to biasing forces at the hinge sections to raise certain ones of the panels in the altitudinal direction, relative to a basal one of the panels for establishing raised panels providing a prop for an electronic device to be placed on the supporting substrate.

2. The stand of claim 1 wherein at least the reverse surface of the strip has high frictional surface characteristics, and the plate of the basal one of the panels is affixed to the obverse surface of the strip such that the reverse surface is exposed along the basal one of the panels for frictionally engaging the supporting substrate.

3. The stand of claim 1 wherein at least the reverse surface of the strip has high frictional surface characteristics, and at least the plate that establishes one of the raised panels is affixed to the obverse surface of the strip such that the reverse surface is exposed along the one of the raised panels for frictionally engaging an electronic device to be propped against the one of the raised panels.

4. The stand of claim 1 including a further basal panel extending in the longitudinal direction, away from the raised panels when the panels are in the erect configuration, for supporting an electronic device to be propped against the raised panels.

5. The stand of claim 4 including at least one stop shoulder on the further basal panel, spaced from the raised panels, for engaging an electronic device to be propped against the raised panels.

6. The stand of claim 1 wherein the material of the strip is an elastomer.

7. The stand of claim 1 wherein the plurality of panels are arranged serially along the strip and include:
   a first panel extending in the longitudinal direction between the first terminal end and a first hinge section;
   a second panel extending in the longitudinal direction between the first hinge section and a second hinge section;
   a third panel extending in the longitudinal direction between the second hinge section and a third hinge section; and
   a fourth panel extending in the longitudinal direction between the third hinge section and an attachment location on the strip; and wherein
   the strip, along a portion of the strip adjacent the first terminal end of the strip, is affixed to the obverse surface of the strip adjacent the attachment location, and the attachment location is placed on the strip such that the third and fourth panels are biased by the third hinge section into a basal leg of a triangular configuration in which the first and second panels are biased by the first and second hinge sections into apical legs of the triangular configuration, raised from the basal leg to an apex for engaging the electronic device to be propped against the raised first and second panels; and
   the third and fourth panels are foldable selectively about the third hinge section, against the bias of the third hinge section, to collapse the first and second panels toward one another, against the bias of the first and second hinge sections, to establish the collapsed configuration of the panels.

8. The stand of claim 7 including a fourth hinge section in the strip at the attachment location, and wherein the plurality of panels include a fifth panel extending in the longitudinal direction between the fourth hinge section and the second terminal end of the strip, the fifth panel being biased by the fourth hinge section to extend beyond the basal leg of the triangular configuration and establish a platform for the electronic device to be propped against the raised first and second panels, the fifth panel being foldable selectively about the fourth hinge section, against a bias of the fourth hinge section, to collapse the fifth panel against the collapsed first and second panels.

9. The stand of claim 8 including at least one stop shoulder on the fifth panel, spaced from the fourth hinge section in the longitudinal direction for being engaged by an electronic device to be propped against the raised first and second panels.

10. The stand of claim 9 wherein the material of the strip is an elastomer.

11. A method for constructing a compact, collapsible, self-erecting stand for placement upon a supporting substrate to prop a hand-held electronic device to be placed on the supporting substrate, the method comprising:

provinding an elongate strip of material having resiliently flexible characteristics biasing the strip toward a substantially flat configuration extending in a longitudinal direction between first and second terminal ends, in a lateral direction between first and second sides, and in an altitudinal direction between an obverse surface and a reverse surface;

affixing a plurality of substantially rigid plates to the strip, located along the strip to establish a corresponding plurality of panels, each panel comprising a plate affixed to a corresponding surface portion of the strip; and providing a hinge section of the strip interposed between adjacent panels, each hinge section biasing corresponding adjacent panels toward the substantially flat configuration of the strip such that the panels are movable selectively into a collapsed configuration, wherein the panels are folded about the hinge sections into overlapping juxtaposition for compact carrying, and are released selectively to be moved into an erect configuration in response to biasing forces at the hinged sections to raise certain ones of the panels in the altitudinal direction, relative to a basal one of the panels for establishing a prop for an electronic device to be placed on the supporting substrate.

12. The method of claim 11 including:
providing at least the reverse surface of the strip with high frictional surface characteristics; and
affixing the plate of the basal one of the panels to the obverse surface of the strip such that the reverse surface is exposed along the basal one of the panels for frictionally engaging the supporting substrate.

13. The method of claim 11 including:
providing at least the reverse surface of the strip with high frictional surface characteristics; and
affixing the plate of one of the raised panels to the obverse surface of the strip such that the reverse surface is exposed along the one of the raised panels for frictionally engaging an electronic device to be propped against the one of the raised panels.

14. The method of claim 11 including providing a further basal panel extending in the longitudinal direction, away from the raised certain ones of the panels when the panels are in the erect configuration, for supporting an electronic device to be propped against the raised panels.

15. The method of claim 11 including:
arranging the plurality of panels serially along the strip such that:
a first panel is extended in the longitudinal direction between the first terminal end and a first hinge section;
a second panel is extended in the longitudinal direction between the first hinge section and a second hinge section;
a third panel is extended in the longitudinal direction between the second hinge section and a third hinge section; and
a fourth panel is extended in the longitudinal direction between the third hinge section and an attachment location on the strip; and
affixing the strip, along a portion of the strip adjacent the first terminal end of the strip, to the obverse surface of the strip adjacent the attachment location, and
placing the attachment location on the strip such that the third and fourth panels are biased by the third hinge section into a basal leg of a triangular configuration in which the first and second panels are biased by the first and second hinge sections into apical legs of the triangular configuration, raised from the basal leg to an apex for engaging the electronic device to be propped against the raised first and second panels, and the third and fourth panels are foldable selectively about the third hinge section, against the bias of the third hinge section, to collapse the first and second panels toward one another, against the bias of the first and second hinge sections, to establish the collapsed configuration of the panels.

16. The method of claim 15 including providing a fourth hinge section in the strip at the attachment location, and a fifth panel extending in the longitudinal direction between the fourth hinge section and the second terminal end of the strip, the fifth panel being biased by the fourth hinge section to extend beyond the basal leg of the triangular configuration and establish a platform for the electronic device to be propped against the raised first and second panels, the fifth panel being foldable selectively about the fourth hinge section, against a bias of the fourth hinge section, to collapse the fifth panel against the collapsed first and second panels.

17. The method of claim 16 including providing at least one stop shoulder on the fifth panel, spaced from the fourth hinge section in the longitudinal direction for being engaged by an electronic device to be propped against the raised first and second panels.

18. The method of claim 11 wherein the elongate strip of material is provided in the form of an elongate strip of elastomer.

* * * * *